United States Patent [19]

Aronne

[11] Patent Number: 5,379,675
[45] Date of Patent: Jan. 10, 1995

[54] INDICATOR FOR AN EJECTION SEAT FIRING MECHANISM

[75] Inventor: Armand J. Aronne, Massapequa, N.Y.

[73] Assignee: Grumman Aerospace Corporation, Bethpage, N.Y.

[21] Appl. No.: 115,447

[22] Filed: Sep. 1, 1993

[51] Int. Cl.$^6$ .................................. B64D 25/102
[52] U.S. Cl. .............................. 89/1.1; 89/1.14; 244/122 A
[58] Field of Search ............... 244/122 A, 122 AD; 89/1.14, 1.1

[56] References Cited

U.S. PATENT DOCUMENTS

| | | | |
|---|---|---|---|
| 3,308,842 | 3/1967 | Martin | 244/122 A |
| 3,735,948 | 5/1973 | MacDonald et al. | 244/122 A |
| 4,000,917 | 1/1977 | Poehlmann | 285/18 |
| 4,036,456 | 7/1977 | Skinner et al. | 244/122 AD |
| 4,619,255 | 10/1986 | Spinosa et al. | 244/122 A |

*Primary Examiner*—David Brown
*Attorney, Agent, or Firm*—Collard & Roe

[57] ABSTRACT

An ejection seat firing mechanism has a primary cartridge and a firing pin within a housing. A firing head is outside the housing coaxial with the primary cartridge and the firing pin, and a nut affixes the firing head to the firing pin thereby enclosing the housing. A first bore is formed through the flange of the housing and a second bore is formed in the nut spaced from the housing and aligned with the first bore in spaced parallel relation with the axis. A torquing shaft with an internally threaded axial coupling bore formed therein extends a determined distance into the torquing shaft. A spring is coaxially positioned around the torquing shaft and has a top end abutting the nut and a spaced opposite bottom end biasing the torquing shaft toward the flange. A bolt member extends through the first bore and is threadedly coupled with the torquing shaft via the coupling bore. The bolt provides a visual and sensory indication that the primary cartridge is installed and the firing head is torqued.

9 Claims, 1 Drawing Sheet

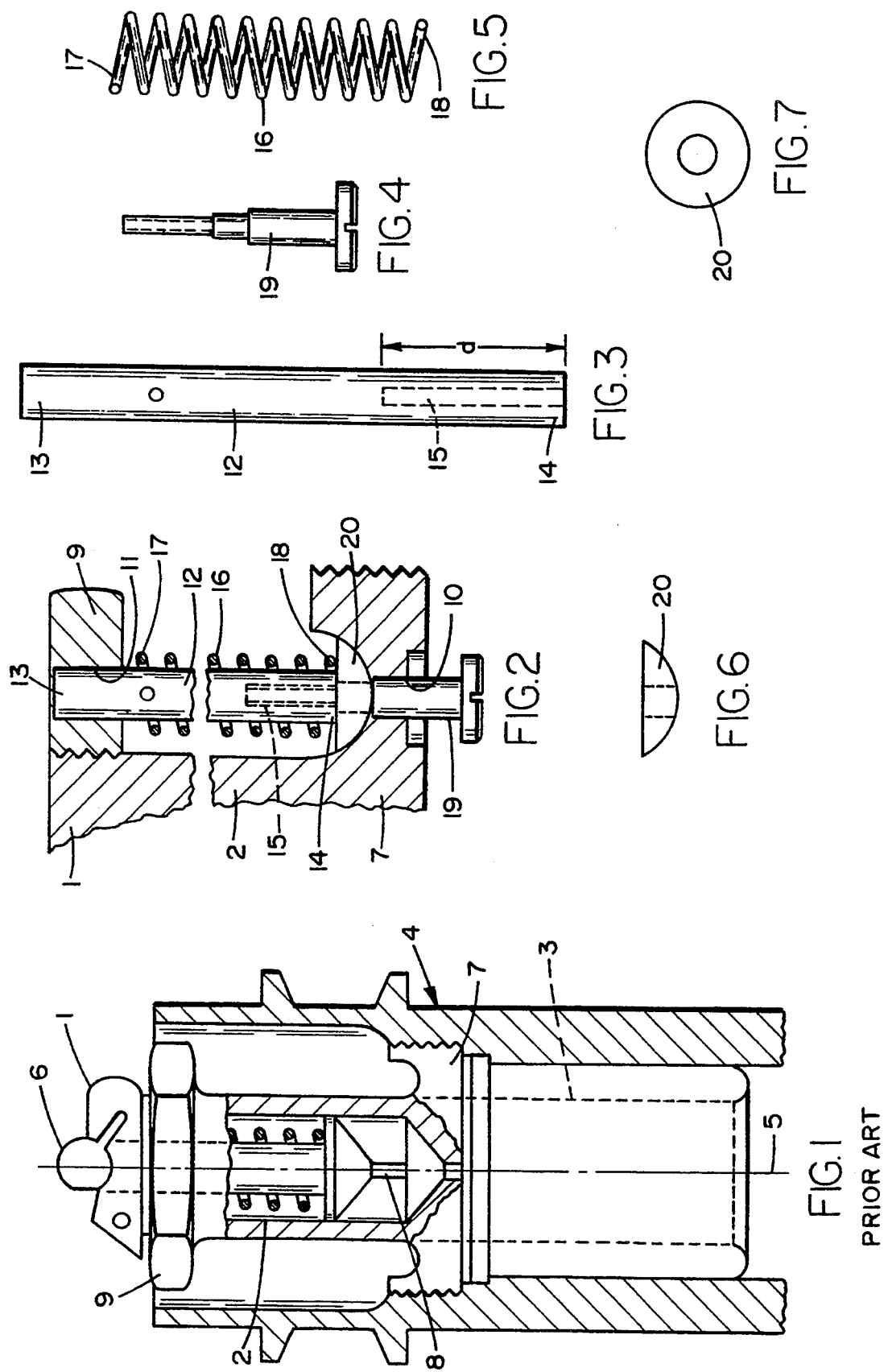

INDICATOR FOR AN EJECTION SEAT FIRING MECHANISM

BACKGROUND OF THE INVENTION

The present invention relates to an ejection seat firing mechanism. More particularly, the invention relates to an aircraft ejection seat firing mechanism.

A major point of failure of Martin Baker aircraft ejection seats is the primary cartridge. This failure is usually fatal. Two common causes of failure are neglecting to insert the primary cartridge and neglecting to screw down and torque the firing head. Each of these neglects is usually fatal.

The principal object of the invention is to provide an ejection seat firing mechanism of simple structure which eliminates failure to insert the primary cartridge and eliminates failure to screw down and torque the firing head.

An object of the invention is to provide an ejection seat firing mechanism which functions efficiently, effectively and reliably to avoid primary cartridge-related failures.

Another object of the invention is to provide an ejection seat firing mechanism which is usable with facility and convenience and functions to avoid primary cartridge-related failures.

Still another object of the invention is to provide an ejection seat firing mechanism of simple structure which functions efficiently, effectively and reliably to eliminate failure to insert the primary cartridge and to eliminate failure to screw down and torque the firing head.

Yet another object of the invention is to provide an ejection seat firing mechanism which presents a visual and sensory indication that the primary cartridge is installed and the firing head is torqued, thereby eliminating primary cartridge-related failures.

BRIEF SUMMARY OF THE INVENTION

In accordance with the invention, an ejection seat firing mechanism comprises means providing a visual and sensory indication when a primary cartridge is installed and a firing head is torqued.

The mechanism has a housing, a primary cartridge and a firing pin in the housing, a firing head outside the housing and a nut affixing the firing head to the firing pin, thereby enclosing the housing. The means comprises a torquing shaft mounted outside the housing in spaced substantially parallel relation with the firing pin and firing head. The housing is of substantially cylindrical configuration having an axis, a top at one end of the axis and a flange at the spaced opposite end of the axis, and the torquing shaft of the means is mounted between the nut and the flange.

The torquing shaft has a first end and a spaced opposite second end and the means further comprises a first bore formed through the flange of the housing spaced from the housing, and a second bore formed in the nut spaced from the housing and aligned with the first bore in substantially parallel relation with the axis and accommodating the first end of the torquing shaft.

The means further comprises a spring coaxially positioned around the torquing shaft the spring having a top end abutting the nut and a spaced opposite bottom end abutting the flange. An internally threaded axial coupling bore is formed in the torquing shaft and extends a determined distance into the torquing shaft and a bolt member extends through the first bore and is threadedly coupled with the torquing shaft via the coupling bore. Compression means is coaxially positioned around the bolt member between the torquing shaft and the flange, thereby mounting the torquing shaft in spaced substantially parallel relation with the axis of the housing.

In accordance with the invention, an ejection seat firing mechanism having a housing of substantially cylindrical configuration having an axis, a top at one end of the axis and a flange at the spaced opposite end of the axis, a primary cartridge and a firing pin in the housing, a firing head outside the housing substantially coaxial with the primary cartridge and the firing pin and a nut affixing the firing head to the firing pin, thereby enclosing the housing, comprises a first bore formed through the flange of the housing spaced from the housing. A second bore is formed in the nut spaced from the housing and aligned with the first bore in spaced substantially parallel relation with the axis. A torquing shaft has a first end seated in the second bore and a spaced opposite second end with an internally threaded axial coupling bore formed therein and extending a determined distance from the second end into the torquing shaft. A spring is coaxially positioned around the torquing shaft and has a top end abutting the nut and a spaced opposite bottom end abutting the flange. A bolt member extends through the first bore and is threadedly coupled with the torquing shaft via the coupling bore. Compression means is coaxially positioned around the bolt member between the torquing shaft and the flange, thereby mounting the torquing shaft in spaced substantially parallel relation with the axis of the housings whereby a visual and sensory indication is provided that the primary cartridge is installed and the firing head is torqued.

BRIEF DESCRIPTION OF THE DRAWINGS

Other objects and features of the present invention will become apparent from the following detailed description considered in connection with the accompanying drawings which disclose an embodiment of the present invention. It should be understood, however, that the drawings are designed for the purpose of illustration only and not as a definition of the limits of the invention.

In the drawings, wherein similar reference characters denote similar elements throughout the several views:

FIG. 1 is a schematic diagram, partly in section, of an embodiment of an ejection seat firing mechanism of the prior art;

FIG. 2 is a schematic diagram, partly in section, of an embodiment of the ejection seat firing mechanism of the invention;

FIG. 3 is a schematic diagram of an embodiment of the torquing shaft of the embodiment of FIG. 2;

FIG. 4 is a schematic diagram of an embodiment of the bolt member of the embodiment of FIG. 2;

FIG. 5 is a schematic diagram of the spring of the embodiment of FIG. 2;

FIG. 6 is a side view of an embodiment of the compression means of the embodiment of FIG. 2; and FIG. 7 is a top view of the embodiment of FIG. 6.

DETAILED DESCRIPTION OF PREFERRED EMBODIMENT

FIG. 1 is a schematic diagram of a Martin Baker aircraft ejection seat firing mechanism. Ejection seat firing mechanisms of known type, as presently in use (FIG. 1) have a firing head 1 in a housing 2 and a primary cartridge 3 fired by said firing head and in a housing 4. As hereinbefore mentioned, a major point of failure of the ejection system is the primary cartridge. This is usually caused by failure to insert the primary cartridge or failure to screw down and torque the firing head. Since the firing head 1 and the primary cartridge 3 are not visible or available to touch, they constitute a source of grave danger to anyone in the aircraft who may have to eject from said aircraft.

The housing 2 of the firing mechanism 1 is substantially cylindrical having an axis 5, a top 6 at one end of said axis and a flange 7 (FIGS. 1 and 2) at the spaced opposite end of said axis. The firing head 1 is outside the housing 2 and includes a firing pin 8 in said housing 2 coaxial with the cartridge 3 and said firing head. A hexagonal nut 9 affixes the firing head 1 to the firing pin 8, thereby enclosing the housing 2.

In accordance with the invention, a first bore 10 is formed through the flange 7 spaced from the housing 2 (FIG. 2). A second bore 11 is formed in the hexagonal nut 9 of the housing 2 and aligned with the first bore 10 in spaced substantially parallel relation with the axis 5 (FIG. 2).

A torquing shaft 12 (FIGS. 2 and 3) has a first end 13 seated in the second bore 11 and a spaced opposite second end 14. An internally threaded axial coupling bore 15 is formed in the second end 14 of the torquing shaft 12 (FIGS. 2 and 3). The coupling bore 15 extends a determined distance d from the second end 14 into the torquing shaft 12 (FIG. 3).

A spring 16 (FIGS. 2 and 5) is coaxially positioned around the torquing shaft 12 and has a top end 17 (FIGS. 2 and 5) abutting the nut 9 and a spaced opposite bottom end 18 (FIGS. 2 and 5) biasing a compression device 20 against the flange 7 (FIG. 2).

A bolt member 19 (FIGS. 2 and 4) extends through the first bore 10 through the flange 7 (FIG. 2) and is threadedly coupled with the torquing shaft 12 via the coupling bore 15 of said torquing shaft, as shown in FIG. 2.

A compression device 20 of any suitable known type such as, for example, a concave or partial hemispherical washer (FIGS. 2, 6 and 7) is positioned around the bolt member 19 between the torquing shaft 12 and the flange 7 (FIG. 2). The torquing shaft 12 is thereby mounted in spaced substantially parallel relation with the axis 5 of the housing 2. This provides a visual and sensory indication that the primary cartridge 3 is installed and the firing head 1 is torqued.

While only a single embodiment of the present invention has been shown and described, it is to be understood that many changes and modifications may be made thereunto without departing from the spirit and scope of the invention as defined in the appended claims.

What is claimed is:

1. An indicator for an ejection seat firing mechanism having a primary cartridge fired by a firing head, the indicator comprising:
   a housing for receiving the primary cartridge; and
   means extending into said housing and displaceable by the primary cartridge for providing a visual and sensory indication when the primary cartridge is installed and the firing head is torqued.

2. The indicator for an ejection seat firing mechanism as claimed in claim 1, wherein said indicator has a firing pin in said housing and a nut affixing said firing head to said firing pin thereby enclosing said housing, and said means comprises a torquing shaft mounted in spaced substantially parallel relation with said firing pin and firing head.

3. The indicator for an ejection seat firing mechanism as claimed in claim 2, wherein said housing is of substantially cylindrical configuration having an axis, a top at one end of said axis and a flange at the spaced opposite end of said axis, and said torquing shaft of said means is mounted between said nut and said flange.

4. The indicator for an ejection seat firing mechanism as claimed in claim 3, wherein said torquing shaft has a first end and a spaced opposite second end and said means further comprises a first bore formed through said flange, and a second bore formed in said nut spaced from said housing and aligned with said first bore in substantially parallel relation with said axis and accommodating the first end of said torquing shaft.

5. The indicator for an ejection seat firing mechanism as claimed in claim 3, said means further comprising a spring coaxially positioned around said torquing shaft, said spring having a top end abutting said nut and a spaced opposite bottom end, said spring biasing said torquing shaft toward said flange.

6. The indicator for an ejection seat firing mechanism as claimed in claim 3, said means further comprising an internally threaded axial coupling bore formed in said torquing shaft and extending a determined distance into said torquing shaft and a bolt member extending through said first bore and threadedly coupled with said torquing shaft via said coupling bore.

7. The indicator for an ejection seat firing mechanism as claimed in claim 6, said means further comprising compression means coaxially positioned around said bolt member between said torquing shaft and said flange, thereby mounting said torquing shaft in spaced substantially parallel relation with the axis of said housing.

8. An indicator for an ejection seat firing mechanism having a housing of substantially cylindrical configuration having an axis, a top at one end of said axis and a flange at the spaced opposite end of said axis, a primary cartridge and a firing pin in said housing, a firing head outside said housing substantially coaxial with said primary cartridge and said firing pin and a nut affixing said firing head to said firing pin thereby enclosing said housing, said ejection seat firing mechanism comprising:
   a first bore formed through said flange of said housing;
   a second bore formed in said nut spaced from said housing and aligned with said first bore in spaced substantially parallel relation with said axis;
   a torquing shaft having a first end seated in said second bore and a spaced opposite second end with an internally threaded axial coupling bore formed therein and extending a determined distance from said second end into said torquing shaft;
   a spring coaxially positioned around said torquing shaft and having a top end abutting said nut and a spaced opposite bottom end, said spring biasing said torquing shaft toward said flange;
   a bolt member extending through said first bore and threadedly coupled with said torquing shaft via said coupling bore; and
   compression means coaxially positioned around said bolt member between said torquing shaft and said flange, thereby mounting said torquing shaft in spaced substantially parallel relation with the axis of said housing, whereby said primary cartridge displaces said bolt member and said torquing shaft to provide a visual and sensory indication that said primary cartridge is installed and said firing head is torqued.

9. An indicator for an ejection seat firing mechanism having a housing for receiving a primary cartridge and a nut for attaching a firing head to a firing pin thereby enclosing the housing, the housing having a first bore formed therein and the nut having a second fore formed therein, the indicator comprising:

a shaft movably disposed within both the first and second bores and extending into the housing, wherein the primary cartridge and proper installation of the firing head displace said shaft so that a visual and sensory indication is provided.

* * * * *